Figure 1:
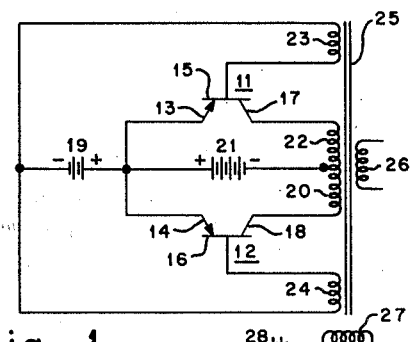

May 12, 1964 J. S. DENELSBECK ETAL 3,133,256
FREQUENCY VARIABLE FLUX COUPLED OSCILLATOR
Filed Jan. 7, 1958

INVENTORS
JOHN S. DENELSBECK
JOSEPH L. LINDINGER

United States Patent Office 3,133,256
Patented May 12, 1964

3,133,256
FREQUENCY VARIABLE FLUX COUPLED
OSCILLATOR
John S. Denelsbeck, Bristol, and Joseph L. Lindinger, Philadelphia, Pa., assignors to the United States of America as represented by the Secretary of the Navy
Filed Jan. 7, 1958, Ser. No. 707,652
5 Claims. (Cl. 331—113)
(Granted under Title 35, U.S. Code (1952), sec. 266)

The invention described herein may be manufactured and used by or for the Government of the United States of America for governmental purposes without the payment of any royalties thereon or therefor.

The present invention relates to a flux coupled oscillator and more particularly to a temperature compensated flux coupled oscillator in which the saturable core characteristics thereof are modified to effect an alternating output voltage of frequency proportional to the magnitude of an externally applied transverse magnetic field.

The flux coupled oscillator of the instant invention employs a pair of semi-conductor devices in a basic switching circuit of a type known in the art for converting a uni-directional voltage into an alternating output voltage of proportionate frequency. A common disadvantage characterizing these elements is the fact that they are temperature sensitive, consequently causing frequency deviation of the alternating output voltage. In accordance with the invention, the conjugate action of a temperature sensitive resistance and a solenoid winding transversely coupled with the core of the oscillator not only compensates for effects of temperature, but in addition, provides a novel means of producing an alternating output voltage of frequency proportional to the amount of transverse magnetic coupling. Accordingly, An object of the present invention is the provision of a temperature compensated flux coupled oscillator in which the frequency output thereof is independent of changes in ambient temperature.

Another object is to provide a temperature compensated flux coupled oscillator in which the frequency of the alternating output voltage is proportional to the magnitude of an externally applied transverse magnetic field.

A further object of the invention is the provision of a temperature compensated flux coupled oscillator in which the frequency of the alternating output voltage varies analogously according to input shaft displacements effective to control the coupling of a transversely applied magnetic field.

A final object of the present invention is the provision of a temperature compensated flux coupled oscillator in which the application of a transverse magnetic field corrects for nonlinearity of operation evidenced in multivibrator devices employing saturable cores, particularly at the higher frequencies.

Figure 2:
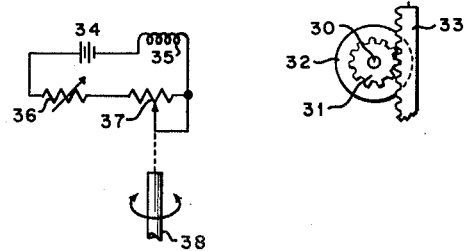
Figure 3:
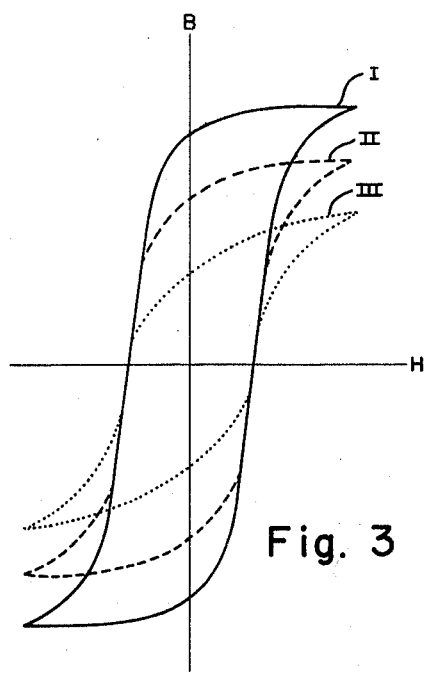
Figure 4:
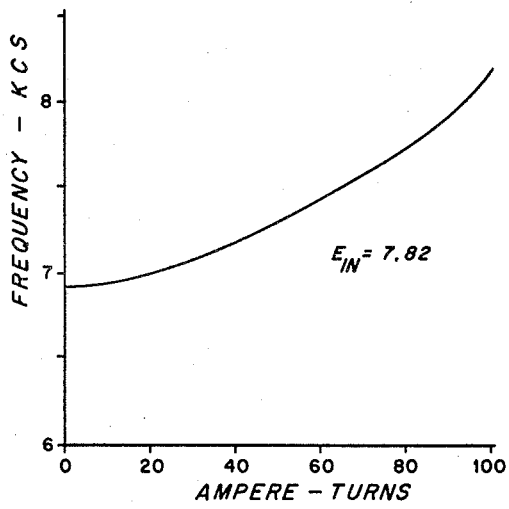
Figure 5:
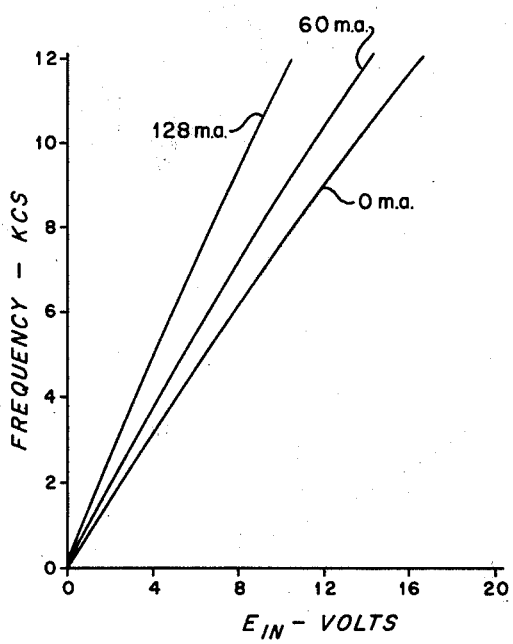

The exact nature of this invention as well as other objects and advantages thereof will be readily apparent from consideration of the following specification relating to the annexed drawing in which:

FIG. 1 is a schematic representation of a preferred embodiment of the invention, FIG. 2 is a schematic representation of an alternative electrical structure which is intended to be used with the oscillator proper, shown in FIG. 1, in place of the mechanically positioned assembly for generating and controlling the transverse magnetic field, as illustrated in FIG. 1, FIG. 3 is a graphical representation of a plurality of dynamic hysteresis curves obtained for different magnitudes of transversely coupled static magnetic fields, FIG. 4 is a graphical representation showing the variation of output frequency of the flux coupled oscillator as a function of the ampere-turns of the transversely coupled external winding, and FIG. 5 is a graphical representation showing the variation of the output frequency of the flux coupled oscillator as a function of the D.C. input voltage for arbitrary values of current flow through the winding.

Referring now to the drawings, there is illustrated in FIG. 1 a schematic representation of a basic type of multivibrator switching circuit employing in this instance PNP junction transistors generally designated by numerals 11 and 12, although in this respect it will be understood in the art that NPN junction type transistors, as well as the contact type, are equally applicable. The respective transistors 11 and 12 each includes an emitter electrode, 13 or 14, a base electrode, 15 or 16, and a collector electrode, 17 or 18. Uni-directional potential sources indicated by batteries 19 and 21 having polarity connections as shown in FIG. 1, supply the forward bias and the collector voltage for the transistors, respectively. A plurality of windings 20, 22, 23, and 24 are suitably electrically interconnected to render each of the transistors alternately conducting and non-conducting, thereby manifesting typical multivibrator switching operation as recognized in the art. Winding 26 is an output winding. The core 25 upon which these windings are formed and linked in inductive relation to each other may be of torridal shape as practiced in the instant invention, and comprises a plurality of layers contiguously wound from a continuous length of magnetic core material of a commonly available type, preferably having rectangular hysteresis loop characteristics. The instant invention in this respect has successfully utilized Deltamax and Mo-Permalloy as magnetic core materials. It should be noted that Deltamax is a grain oriented structure containing nickel and iron in equal amounts, while on the other hand, Mo-Permalloy is a random grain structure containing 79% nickel, 17% iron, and 4% molybdenum.

In addition to the basic structure of the oscillator proper shown in FIG. 1, there is also portrayed a series electrical circuit comprising an external winding 27 schematically illustrated to be transversely disposed in juxtaposition with the core 25, a constant voltage source 28, and a temperature sensitive resistance 29, such as a thermistor or the like. The thermistor has a suitable temperature coefficient so that the variations in current produced by changes in the intrinsic resistance thereof generates a field of suitable magnitude to maintain the frequency of the flux coupled oscillator independent of ambient temperature changes. In the embodiment of FIG. 1, winding 27, comprising 5000 turns or thereabouts, was wound on a cylindrical form having the approximate dimensions of 6 inches by a 3 inch diameter. These dimensions accommodate the facile insertion of the toroidal core of the oscillator proper for movement within winding 27 in accordance with inventive principles of a transversely applied magnetic field. Winding 27 will thus generate an intrinsic magnetic field which is substantially at right angles to the flux flowing in core 25. In the presence of permeable core 25, some distortion in the magnetic field configuration produced by winding 27 will occur. It is deemed apparent to one skilled in the art to alternatively supply the transverse field with the aid of permanent type magnets. A rack 33 and pinion 31 is depicted in FIG. 1 to be in a mechanically coupled relation with winding 27 as indicated by the dotted line notation. Component 32 having a drive shaft 30 keyed to pinion 31 may be a servo motor, although the quantity to be translated may be a direct rotary shaft displacement, or the like. Thus, the transverse winding 27 mounted for movement in the manner denoted above and schematically indicated in FIG. 1 is capable of influencing core 25, the degree of coupling depending, of course, upon the relative proximity of winding 27. The manner in which the saturable characteristics of the core of the flux coupled oscillator is modified will become apparent subsequently in connection with FIG. 3.

Referring next to FIG. 2, this view illustrates a series electrical circuit of alternative type comprising a constant voltage source 34, a winding 35 identical in electrical function with winding 27, a thermistor 36, and a rheostat 37. The wiper of rheostat 37 is mechanically coupled with rotary shaft 38, which is thus instrumental to control the flow of current in the circuit according to the angular displacement of shaft 38. Thermistor 36 has a suitable temperature coefficient and functions in a manner identical with thermistor 29. In the alternative embodiment herein delineated, winding 35, consisting of approximately 1500 turns, is wound directly across the outer diameter of the toroidal core 25 of the oscillator. Thus, this arrangement provides as before the introduction of a magnetic field which is at right angles to the flux present in core 25.

FIG. 3 presents a graphical representation of the effect of a transverse static magnetic field on 60 cycle hysteresis loops for a Mo-Permalloy core. In the acquisition of data for these hysteresis loops, the magnetomotive force (H) required to obtain saturation remained at a constant value. As the external field was increased, the saturation flux (B) decreased. Hence, the dynamic hysteresis loops designated by roman numerals I, II and III are progressively compressed in the symmetrical manner illustrated to thus lower the saturation level as the transversely imposed magnetic field is increased in magnitude. An insight into this manifestation indicates that the material of core 25 saturates in a direction which is the resultant vector sum of the two fields, i.e., the original flux present in core 25 and the external flux of either winding 27 or 35, as appropriate, orthogonally related to the original flux. The ability of the hysteresis loops to dynamically exhibit such a characteristic is of paramount significance, since the frequency of the alternating output voltage is a direct function of the time required for the oscillator to go into saturation.

FIG. 4 graphically illustrates a typical variation of the output frequency of the flux coupled oscillator as a function of ampere-turns of the external winding for a fixed input potential of source 21 of 7.82 volts. The curve is specifically applicable to an embodiment in which the toroidal core 25 contains 50 wraps of ¼″ x ⅛ mil Mo-Permalloy and the transverse field is applied in accordance with the description set forth relative to FIG. 2.

With respect to FIG. 5, it comprises a graphical representation of the manner in which the output frequency varies as a function of the input potential of battery 21 for three specific values of current through the external winding. The relatively straight-line curves herein indicated were obtained in connection with the embodiment set forth in FIG. 1, the toroidal core 25 containing in this instance 40 wraps of ¼″ x ⅛ mil Deltamax. The curve having the least slope and labelled as 0 m.a. represents the locus of operation of the flux coupled oscillator independent of any externally applied field. Hence, as the current is made to increase through winding 27, the slope of the straight-line curves becomes steeper. Therefore, it is apparent that an additional attribute of the inventive device is to provide frequency calibration or correction, enabling the frequency of the finished oscillator to be set within a range of desired input voltages. In this respect, it is also noteworthy that the linearity of operation in an oscillator of a type utilizing the saturable core characteristics thereof is greatly improved by embodying an external winding. The following table illustrates the manner in which frequency deviation from the theoretically calculated value is significantly minimized through the use of such compensating winding.

Table I

| $F_1$ | $F_2$ | $F_3$ | $F_1-F_2$ | $F_1-F_3$ |
|---|---|---|---|---|
| 1,380 | 1,379 | 1,379 | 1 | −1 |
| 4,121 | 4,120 | 4,123 | 1 | −2 |
| 6,871 | 6,865 | 6,880 | 6 | −9 |
| 9,754 | 9,520 | 9,726 | 234 | +28 |
| 11,156 | 10,839 | 11,120 | 317 | +36 |
| 13,892 | 13,366 | 13,870 | 526 | +22 |
| 15,254 | 14,620 | 15,250 | 634 | +4 |
| 16,660 | 15,856 | 16,660 | 804 | −0 |
| 19,428 | 18,286 | 19,469 | 1,142 | −41 |
| 20,825 | 19,480 | 20,900 | 1,445 | −75 | where the definition of the terms are as follows:

$F_1$, theoretically calculated frequency
$F_2$, measured frequency with no compensation
$F_3$, measured frequency with compensation
$F_1-F_2$, frequency deviation—uncompensated
$F_1-F_3$, frequency deviation—compensated.

The table shows that the mean deviation evidenced by the quantity $F_1-F_3$ is decidedly less wherein an external compensating winding is employed.

The operation of the flux coupled oscillator may be best set forth with reference to the embodiment illustrated in FIG. 1 and the magnetic hysteresis loop characteristics shown in FIG. 3. Hence, upon application of input voltage supplied from source 21, one transistor will tend to conduct more current than the other due to normal differences in characteristics, thereby producing a larger magnetizing force either in winding 20 or winding 22, which serves as a drive winding. It is assumed that transistor 11 is conducting more than 12, the net magnetizing force will induce voltages in all windings of a polarity that corresponds with that of winding 22. The voltage induced in winding 23 will serve to increase the collector current of transistor 11 and that in winding 24 will serve to decrease the collector current of transistor 12. This produces a cumulative effect that results in transistor 11 being driven rapidly to saturation and transistor 12 being driven rapidly to cut-off. The core flux will continue to rise until saturation occurs at which time the rate of change of flux falls to zero removing a positive feedback to winding 23 and a negative feedback to winding 24. The absence of feedback associated with windings 23 and 24 results in removal of the base drive required to maintain sufficient current through transistor 11 to keep the core in a saturated state. At this point the core flux will fall from its saturated value reversing the sign of the rate of change of flux. This decay of magnetic field induces positive feedback to winding 24 and negative feedback to winding 23 so that transistor 12 now conducts with transistor 11 being cut off. Thus, the flux changes from one saturation state to the other with the driving input voltage of source 21 effectively placed now across winding 20. In output winding 26, an alternating voltage quantity is induced of frequency proportional to the conjugate magnitudes of the input voltage and the transversely imposed field of winding 27. Since the time required for the windings of the oscillator to go into saturation depends upon the location of the saturation points on the hysteresis loop, the output frequency of winding 26 varies accordingly. Thus by employing to advantage the effective compression of a dynamic hysteresis loop as a function of an externally applied flux orthogonal to the original flux, the flux coupled oscillator of the instant invention not only compensates for effects of temperature, but in addition, provides for a novel means of producing an alternating output voltage of frequency proportional to the amount of transverse magnetic flux coupling the core of the flux coupled oscillator.

Hence, the instant invention supplies structure which substantially enhances the performance of a multivibrator switch circuit embracing for its operation semi-conductor devices and a plurality of suitably interconnected windings wound on a saturable core. By incorporating an external transverse winding, not only is an improvement in linearity of operation realized, but also, the instant invention presents novel means for obtaining an alternating output quantity of frequency proportional to the degree of transverse magnetic flux coupling the core of the flux coupled oscillator effected as a function of a quantity which is to be translated, such as a shaft rotation. Furthermore, the use of a temperature sensitive element in conjunction with an external winding nullifies the effect of changes in ambient temperature, enabling the frequency output of the flux coupled oscillator to be independent of this parameter.

Obviously many modifications and variations of the present invention are possible in the light of the above teachings. It is therefore to be understood that, within the scope of the appended claims, the invention may be practiced otherwise than as specifically described.

What is claimed is:

1. A flux coupled oscillator comprising a pair of semiconductor devices, each including a base electrode, an emitter electrode, and a collector electrode, a uni-directional source of voltage having a pair of terminals, a saturable magnetic core having a substantially rectangular hysteresis loop characteristic, first, second, and third winding means linking the core in inductive relation to each other, a source of bias voltage connected between the emitter electrode and the base electrode of each of said devices through a portion of said second winding means, the emitter electrode of each of said devices being connected to one of said terminals, the collector electrode of each of said devices being connected to the other of said terminals through a portion of said first winding means, said second winding means being connected to apply voltages induced therein between the base electrode and the emitter electrode of each of said devices, each of said devices being reciprocally rendered into a cut-off and conducting current condition in response to said induced voltages, said core having a first magnetic flux induced therein to be saturated at a level within a range of energization of said first winding means, a fourth winding disposed transversely relative to said first, second, and third winding means and in juxtaposition with the core inductively linking the winding means for producing a second flux orthogonal to said first flux to modify the saturation level of said core, a second uni-directional voltage source connected to said fourth winding, transducer means mechanically linked with said fourth winding for movement relative to said core, each of the devices being biased so as to transfer from one to the other of said conducting conditions in response to the voltage induced in said second winding means upon each occurrence of saturation of said core, said third winding means having an alternating voltage induced therein of frequency dependent upon the modified saturation level of said core.

2. The flux coupled oscillator of claim 1 wherein the means for producing a second magnetic flux orthogonal to said first magnetic flux includes a temperature sensitive element for effecting frequency correction necessitated by changes in ambient temperature.

3. A flux coupled oscillator comprising a pair of semiconductor devices, each including a base electrode, an emitter electrode, and a collector electrode, a uni-directional source of voltage having a pair of terminals, a saturable magnetic core having a substantially rectangular hysteresis loop characteristic, first, second, and third winding means linking the core in inductive relation to each other, a source of bias voltage connected between the emitter electrode and the base electrode of each of said devices through a portion of said second winding means, the emitter electrode of each of said devices being connected to one of said terminals, the collector electrode of each of said devices being connected to the other of said terminals through a portion of said first winding means, said second winding means being connected to apply voltages induced therein between the base electrode and the emitter electrode of each of said devices, each of said devices being reciprocally rendered into a cut-off and a conducting current condition in response to said induced voltages, said core having a first magnetic flux induced therein to be saturated at a level within a range of energization of said first winding means, and means for producing a second magnetic flux within said core orthogonal to said first magnetic flux to operably modify the saturation level of said core, said last named means including a series electrical circuit comprising a winding disposed transversely relative with the first, second, and third winding means and in juxtaposition with said core inductively linking the winding means, a second uni-directional voltage source, and a rheostat having a wiper mechanically linked to a rotary shaft effective to produce change in rehostat resistance, according to angular displacement of said shaft so that resulting current flow in the series circuit generates said second magnetic field of magnitude proportional to the current flow, each of the devices being biased so as to transfer from one to the other of said conducting conditions in response to the voltage induced in said second winding means upon each occurrence of saturation of said core, said third winding means having an alternating voltage induced therein of frequency dependent upon the modified saturation level of said core.

4. The flux coupled oscillator of claim 3 wherein the series electrical circuit includes a temperature sensitive element for effecting frequency correction of the alternating voltage induced in the third winding means so that a change in intrinsic resistance of the sensitive element causes a current flow in the circuit producing a magnetic flux of magnitude proportional to said change to modify the saturation level of the core in a direction to compensate for a variation in ambient temperature.

5. A temperature compensated flux coupled oscillator comprising a pair of semi-conductor devices, each including a base electrode, an emitter electrode, and a collector electrode, a uni-directional source of voltage having a pair of terminals, a saturable magnetic core having a substantially rectangular hysteresis loop characteristics, first, second, and third winding means linking the core in inductive relation to each other, a source of bias voltage connected between the emitter electrode and the base electrode of each of said devices through a portion of said second winding means, the emitter electrode of each of said devices being connected to one of said terminals, the collector electrode of each of said devices being connected to the other of said terminals through a portion of said first winding means, said second winding means being connected to apply voltages induced therein between the base electrode and the emitter electrode of each of said devices, each of said devices being reciprocally rendered into a cut-off and a conducting current condition in response to said induced voltages, said core having a first flux induced therein to be saturated at a level within a range of energization of said first winding means, a fourth winding means disposed at right angles relative to said first, second, and third winding means and in juxtaposition with the core to produce a second flux within said core orthogonal to said first flux to operably modify the saturation level of said core according to variations in ambient temperature, a second uni-directional voltage source, and a temperature sensitive element connected in series with the fourth winding means and the second uni-directional voltage source to effect frequency correction of the alternating voltage induced in the third winding means so that a change in intrinsic resistance of the sensitive element causes a current flow in the circuit producing a field of magnitude proportional to said change to modify the saturation level of the core in a direction to compensate for said variations in ambient temperature, each of the devices being biased so as to transfer from one to the other of said conducting conditions in response to the voltage induced in said second winding means upon each occurrence of saturation of said core, the third winding means having an alternating voltage induced therein of frequency dependent upon the modified saturation level of said core irrespective of variations in ambient temperature.

References Cited in the file of this patent

UNITED STATES PATENTS

| | | |
|---|---|---|
| 2,460,637 | Huge | Feb. 1, 1949 |
| 2,725,519 | Malick et al. | Nov. 29, 1955 |
| 2,755,446 | Gabor | July 17, 1956 |
| 2,768,293 | Van Hofweegen | Oct. 23, 1956 |
| 2,783,384 | Bright et al. | Feb. 26, 1957 |
| 2,854,580 | Uchrin et al. | Sept. 30, 1958 |
| 2,915,637 | McAdam | Dec. 1, 1959 |
| 2,959,744 | Wengryn | Nov. 8, 1960 |
| 2,964,716 | Berman | Dec. 13, 1960 |
| 2,991,414 | Tillman | July 4, 1961 |